United States Patent
Stanley et al.

(10) Patent No.: US 6,563,231 B1
(45) Date of Patent: May 13, 2003

(54) OCCUPANT SENSOR

(75) Inventors: James G. Stanley, Novi; Robert A. Stopper, Jr., Plymouth; Judson G. McDonnell, Farmington Hills, all of MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/474,469

(22) Filed: Dec. 29, 1999

Related U.S. Application Data (60) Provisional application No. 60/143,761, filed on Jul. 12, 1999, provisional application No. 60/133,632, filed on May 11, 1999, provisional application No. 60/133,630, filed on May 11, 1999, and provisional application No. 60/114,269, filed on Dec. 30, 1998.

(51) Int. Cl.⁷ .............................. B60L 1/00; B60L 3/00
(52) U.S. Cl. ..................................................... 307/10.1
(58) Field of Search ................................ 307/9.1, 10.1; 340/438, 457.1, 665, 666, 667; 280/734, 735

(56) References Cited

U.S. PATENT DOCUMENTS

| | | | |
|---|---|---|---|
| 3,111,608 A | 11/1963 | Boenning et al. ........... 361/179 |
| 3,177,481 A | 4/1965 | Joy et al. ................. 246/167 R |
| 3,237,105 A | 2/1966 | Kalmus ....................... 340/562 |
| 3,324,848 A | 6/1967 | Domeier et al. ............ 600/535 |
| 3,439,358 A | 4/1969 | Salmons ..................... 340/552 |
| 3,740,567 A | 6/1973 | Atkins .................... 307/10 SB |
| 3,898,472 A | 8/1975 | Long ...................... 307/10 SB |
| 3,943,376 A | 3/1976 | Long ........................... 307/116 |
| 4,300,116 A | 11/1981 | Stahovec ...................... 340/32 |
| 4,430,645 A | 2/1984 | Eskandry et al. ........... 340/572 |
| 4,625,329 A | 11/1986 | Ishikawa et al. .............. 382/1 |
| 4,796,013 A | 1/1989 | Yasuda et al. .............. 340/562 |
| 4,831,279 A | 5/1989 | Ingraham .................... 307/116 |
| 4,887,024 A | 12/1989 | Sugiyama et al. .......... 324/674 |
| 4,980,519 A | 12/1990 | Mathews ...................... 178/19 |
| 5,071,160 A | 12/1991 | White et al. ................. 280/735 |
| 5,118,134 A | 6/1992 | Mattes et al. ................ 280/735 |
| 5,166,679 A | 11/1992 | Vranish et al. .......... 340/870.37 |
| 5,177,445 A | 1/1993 | Cross ......................... 324/637 |
| 5,214,388 A | 5/1993 | Vranish et al. ............. 324/683 |
| 5,247,261 A | 9/1993 | Gershenfeld ................ 324/674 |
| 5,247,281 A | 9/1993 | Facon et al. ................ 340/562 |
| 5,330,226 A | 7/1994 | Gentry et al. ............... 280/735 |
| 5,373,245 A | 12/1994 | Vranish ...................... 324/662 |
| 5,398,185 A | 3/1995 | Omura .................... 364/424.05 |
| 5,411,289 A | 5/1995 | Smith et al. ................ 280/735 |
| 5,413,378 A | 5/1995 | Steffens, Jr. et al. ........ 280/735 |
| 5,439,249 A | 8/1995 | Steffens, Jr. et al. ........ 280/735 |
| 5,442,347 A | 8/1995 | Vranish ................. 340/870.37 |
| 5,446,391 A | 8/1995 | Aoki et al. .................. 324/661 |
| 5,446,661 A | 8/1995 | Gioutsos et al. ....... 364/424.05 |
| 5,454,591 A | 10/1995 | Mazur et al. ................ 280/735 |
| 5,482,314 A | 1/1996 | Corrado et al. ............. 280/735 |
| 5,490,069 A | 2/1996 | Giutsos et al. .............. 280/735 |
| 5,515,933 A | 5/1996 | Meyer et al. ................ 180/273 |
| 5,525,843 A | 6/1996 | Howing ....................... 307/9.1 |
| 5,528,698 A | 6/1996 | Kamei ....................... 382/100 |
| 5,531,472 A | 7/1996 | Semchena et al. .......... 280/735 |
| 5,539,292 A | 7/1996 | Vranish ................... 318/568.21 |
| 5,549,323 A | 8/1996 | Davis ....................... 280/728.3 |
| 5,570,903 A | 11/1996 | Meister et al. .............. 280/735 |
| 5,602,734 A | 2/1997 | Kithil ................... 364/424.055 |
| 5,618,056 A | 4/1997 | Schoos et al. .............. 280/735 |
| 5,626,359 A | 5/1997 | Steffens, Jr. et al. ........ 280/735 |
| 5,691,693 A | 11/1997 | Kithil ......................... 340/439 |
| 5,722,686 A | 3/1998 | Blackburn et al. .......... 280/735 |
| 5,724,024 A | 3/1998 | Sonderegger et al. ....... 340/562 |
| 5,726,581 A | 3/1998 | Vranish ...................... 324/688 |
| 5,730,165 A | 3/1998 | Philipp .......................... 137/1 |
| 5,770,997 A | 6/1998 | Kleinberg et al. ........... 280/235 |
| 5,793,176 A | 8/1998 | Novak ........................ 318/587 |
| 5,802,479 A | 9/1998 | Kithill et al. ................. 701/45 |
| 5,844,415 A | 12/1998 | Gershenfeld et al. ....... 324/663 |
| 5,844,486 A | 12/1998 | Kithil et al. ................ 340/573 |
| 5,871,232 A | 2/1999 | White ........................ 280/735 |
| 5,914,610 A | 6/1999 | Gershenfeld et al. ....... 324/663 |
| 5,948,031 A | 9/1999 | Jinno et al. ................... 701/45 |
| 5,964,478 A | 10/1999 | Stanley et al. .............. 280/735 |
| 6,014,602 A | 1/2000 | Kithil et al. .................. 701/45 |
| 6,043,743 A | 3/2000 | Saito et al. ................. 340/562 |
| 6,158,768 A | 12/2000 | Steffens, Jr. et al. ........ 280/735 |
| 6,186,538 B1 | 2/2001 | Hamada et al. ............. 280/735 |
| 6,208,249 B1 | 3/2001 | Saito et al. ................. 340/561 |

OTHER PUBLICATIONS

Fink, Donald G. and Beaty, H. W,; Standard Handbook for Electrical Engineers 12th ed., McGraw–Hill Book Co, 1987, pp. 3–57 through 3–65.

Smith, J.R.; "Field Mice: Extracting hand geometry from electric field measurements", IBM Systems Journal, vol. 35, Nos. 3&4, 1996.

References Data for Engineers: Radio, Electronics, Computer, and Communications 7th edition, E.C. Jordan editor in chief, Howard W. Sams, 1985, pp. 12–3 through 12–12.

H. Philipp, "The Charge Transfer Sensor", Sensors magazine, Nov. 1996.

Jinno K.; Ofuji, M.; Saito, T.; Sekido, S.; "Occupant Sensing Utilizing Perturbation of Electric Fields", SAE 971051, Reprinted from: Anthropomorphic Dummies and Crash Instrumentation Sensors (SP–1261), SAE International Congress & Exposition, Detroit, MI Feb. 24–27, 1997.

*Primary Examiner*—Edward H. Tso
(74) *Attorney, Agent, or Firm*—Dinnin & Dunn, P.C.

(57) ABSTRACT

An occupant sensor comprises an electric field sensor comprising a plurality of first electrodes mountable within a vehicle seat, wherein the plurality of first electrodes are disposed on a common surface and are non-overlapping with one another. The electric field sensor further comprises at least one second electrode, wherein the first and second electrodes are proximate to one another. A sensing circuit is operatively coupled to the first and second electrodes so as to control the level of capacitance between an occupant on said vehicle seat and the circuit ground. In a second aspect, the electric field sensor incorporates a lattice electrode with a ground plane. In a third aspect, the electric field sensor incorporates a receive electrode that receives a signal from a sensing electrode for purposes of mitigating the effects of a seat wetting condition.

36 Claims, 3 Drawing Sheets

OCCUPANT SENSOR

CROSS-REFERENCE TO RELATED APPLICATIONS

The instant application claims the benefit of prior U.S. Provisional Application Ser. No. 60/114,269 filed on Dec. 30, 1998.

The instant application also claims the benefit of prior U.S. Provisional Application Ser. No. 60/133,630 filed on May 11, 1999.

The instant application also claims the benefit of prior U.S. Provisional Application Ser. No. 60/133,632 filed on May 11, 1999.

The instant application also claims the benefit of prior U.S. Provisional Application Ser. No. 60/143,761 filed on Jul. 12, 1999.

Co-pending, commonly owned U.S. application Ser. No. 09/474,600 entitled Occupant Detection System, filed on Dec. 29, 1999, entitled "Occupant Detection System", Docket No. ASL-222-US, discloses an occupant detection system comprising an electric field sensor in a seat bottom, and a range/proximity sensor for sensing the presence of an object in a region proximate to a restraint actuator of a safety restraint system.

Co-pending, commonly owned U.S. application Ser. No. 09/474,470 entitled Occupant Detection System, filed on Dec. 29, 1999, entitled "Occupant Detection System", Docket No. ASL-228-US, discloses an occupant detection system comprising an electric field sensor and a weight sensor in a seat bottom.

Co-pending, commonly owned U.S. application Ser. No. 09/474,473 entitled Occupant Detection System, filed on Dec. 29, 1999, entitled "Occupant Detection System", Docket No. ASL-257-US, discloses an occupant detection system comprising an electric field sensor in a seat bottom, and a range/proximity sensor for sensing an occupant proximate to a seat back.

Co-pending, commonly owned U.S. application Ser. No. 09/474,673 entitled Occupant Detection System, filed on Dec. 29, 1999, now U.S. Pat. No. 6,283,504, entitled "Occupant Sensor", Docket No. ASL-258-US, discloses an occupant sensor comprising an electric field sensor in a seat bottom, wherein the electric field sensor is adapted for discriminating child seats on the seat.

The above-identified applications are incorporated herein by reference.

TECHNICAL ART

The instant invention generally relates to occupant sensors for detecting an object on the seat of a vehicle, and, more particularly, to occupant sensors that are responsive to an electric field.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. For example, unbelted occupants. subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Yet another technique for mitigating injury to occupants by the air bag inflator is to control the activation of the inflator responsive to the presence and position of the occupant, thereby activating the inflator only when an occupant is positioned outside the associated at-risk zone of the inflator. NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires an occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can be incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,323 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacitance responsive control circuit for detecting transient capacitive changes related to the presence of a person. U.S. Pat. Nos. 4,980,519 and 5,214,388 teach the use of an array of capacitive sensors for detecting the proximity of au object. U.S. Pat. No. 5,447,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. Nos. 5,602,734 and 5,802,479 teach an array of electrodes mounted above the occupant for purposes of sensing occupant position based upon the influence of the occupant on the capacitance among the electrodes. U.S. Pat. No. 5,166,679 teaches a capacitive proximity sensor with a reflector driven at the same voltage as the sensing element to modify the sensing characteristic of the sensor. U.S. Pat. No. 5,770,997 teaches a capacitive vehicle occupant position sensing system wherein the sensor generates a reflected electric field for generating an output signal indicative of the presence of an object. U.S. Pat. Nos. 3,943,376, 3,898,472, 5,722,686, and 5,724,024 also teach capacitive-based systems for sensing occupants in motor vehicles.

In addition to methods taught by the above referenced U.S. Patents, the prior art also teaches various means of measuring capacitance, as for example given in the *Standard Handbook for Electrical Engineers* $12^{th}$ edition, D. G. Fink and H. W. Beaty editors, McGraw Hill, 1987, pp. 3–57 through 3–65 or in Reference Data for Engineers: Radio, Electronics, Computer, and Communications $7^{th}$ edition, E. C. Jordon editor in chief, Howard W. Sams, 1985, pp. 12–3 through 12–12, both included herein by reference.

The technical paper "Field mice: Extracting hand geometry from electric field measurements" by J. R. Smith, published in IBM Systems Journal, Vol. 35, Nos. 3 & 4, 1996, pp. 587–608, incorporated herein by reference, describes the concept of Electric Field Sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode", "shunt mode", and "transmit mode" which correspond to various possible electric current pathways. In the shunt mode, a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the transmit mode, the transmit electrode is put in contact with the user's body, which then becomes a transmitter relative to a receiver, either by direct electrical connection or via capacitive coupling.

In one embodiment, a plurality of capacitive sensors are used to sense distances to the occupant, which in combination with the known locations of the fixed sensor elements are triangulated to locate the position of the occupant. One problem with such capacitive sensor arrangements is that they make use of the dielectric constant of known stability to detect the distance between a sensor and the occupant. Furthermore, the occupant position measurement tends to be associated with the center of mass of the sensed object. However, the sensor can be confused by large metal devices or arms/limbs in close proximity. Therefore, while these sensors may perform satisfactorily as an automatic "on/off" switch to either disable the air bag inflator based upon occupant position, or enable the air bag inflator to be fired responsive to the activation signal from the vehicle crash sensor, the present embodiments of capacitive occupant position sensors may not be sufficiently accurate and robust to provide for controllable inflation based upon occupant position.

Occupant sensing systems that use capacitive sensors have significant problems when the sensor is wet and especially when the water near the sensor has good coupling to ground. The frequency dependent response of wet objects is discussed in an article describing capacitive sensing techniques by H. Philipp, entitled "The Charge Transfer Sensor", from the November, 1996 issue of Sensors magazine, incorporated by reference herein. One prior-art capacitive sensing system that uses sensors in the seat back and the seat bottom reportedly has problems because the seat back angle creates changes in the sensor signals independent of the occupant situation.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic base sensors would require a significant amount of hardware proximate the inflator door if the at-risk zone proximate the inflator is to be monitored.

Some prior-art occupant detection systems attempt to identify the type of occupant or object in the passenger side seat, for example to discriminate a rear facing infant seat from a normally seated adult in the passenger seat. This is a very challenging task as there are a large variety of possible situations. Sensor systems that use distance measurements to identify occupant situations attempt to use information about relatively few points in space to identify the type of occupant in the seat from among many possibilities. Since the outer surface of any particular situation can change dramatically by doing something as simple as tossing a blanket over the occupant or changing the seat position, results are sometimes unreliable. Sensing systems that use some form of range sensing across significant distances within the occupant compartment can be blocked by objects such as newspapers, maps or floating balloons. Some occupant detection systems incorporate a complex algorithm that, while sometimes compensating for the lack of direct sensory information, can cause unpredictable or anomalous performance.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task, —the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

NHTSA recommends the use of towels under child seats to make them stable. Some prior-art sensing systems discriminate between child seats and occupants seated directly on the seat by their corresponding pressure patterns. A towel, or other object, placed under a child seat could make the child seat's pressure pattern appear like an occupant seated directly on the seat, but would have relatively little effect on the electric field sensor of the capacitive sensing subsystem.

Another problem with some prior-art occupant detection systems is their inability to disable the air bag during a pre-impact breaking event.

SUMMARY OF THE INVENTION

The instant invention overcomes the above-noted problems by providing an occupant sensor comprises an electric field sensor comprising a plurality of first electrodes mountable within a vehicle seat, wherein the plurality of first electrodes are disposed on a common surface and are non-overlapping with one another. The electric field sensor further comprises at least one second electrode, wherein the first and second electrodes are proximate to one another. A sensing circuit is operatively coupled to the first and second electrodes applies respective first and second applied signals respectively to the first and second electrodes, wherein the second applied signal is either a circuit ground, the first applied signal, a signal switched between a floating level and a circuit ground, or a potential between said first applied signal and said circuit ground, so as to control the level of capacitance between an occupant on said vehicle seat and the circuit ground. The first sensing circuit generates a signal responsive to at least one electric-field-influencing property of an object proximate to the electric field sensor.

The instant invention further provides an occupant sensor comprising an electric field sensor comprising at least one first electrode mountable within a vehicle seat, wherein the at least one first electrode comprises a lattice. A first sensing circuit operatively coupled to at least one said first electrode generates a signal responsive to at least one electric-field-influencing property of an object proximate to the first electric field sensor. By constructing the sensor as a lattice, the electrodes may be constructed more economically without sacrificing performance.

The instant invention yet further provides an occupant sensor comprising a first electric field sensor comprising at least one first electrode mountable within a vehicle seat; and at least one second electrode, wherein the second electrode is isolated from the first electrode and is adapted to receive a first signal from the first electrode. A sensing circuit is operatively coupled to at least one first electrode and to at least one second electrode generates a second signal responsive to at least one electric field influencing property of an object proximate to the first electric field sensor, wherein a signal applied to the first electrode is received by the second electrode. Accordingly, the second electrode acts as an electric field receiver, wherein the signal received by the second electrode is responsive to the degree of wetness of the seat.

Accordingly, one object of the instant invention is to provide an improved occupant sensor incorporating an electric field sensor that provides for more consistent measurements of the capacitance of a sensing electrode with respect to a circuit ground.

A further object of the instant invention is to provide an improved occupant sensor incorporating an electric field sensor that is more economical to produce.

A yet further object of the instant invention is to provide an improved occupant sensor incorporating an electric field sensor that is adapted to mitigate the effects of a wetting condition of a vehicle seat.

These and other objects, features, and advantages of the instant invention will be more fully understood after reading the following detailed description of the preferred embodiment with reference to the accompanying drawings and viewed in accordance with the appended claims.

DETAILED DESCRIPTION OF THE PREFERRED EMBODIMENT(S)

Figure 1:
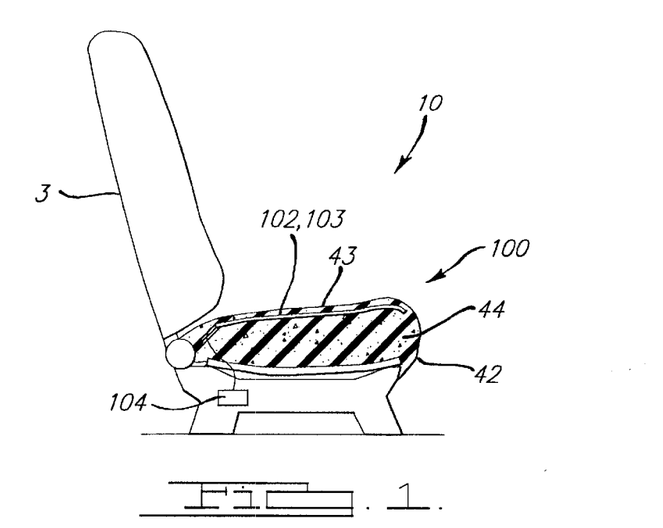
FIG. 1 illustrates an environment of an electric field sensor in accordance with the instant invention.

Referring to FIG. 1, an occupant sensor 10 comprises an electric field sensor 100 mountable in a vehicle seat 3, for example beneath the seat cover 43 and above the foam cushion 44 of the seat bottom 42 of the seat 3. The electric field sensor 100 comprises a a capacitive sensing pad 102 having least one electrode 103 in that is operatively coupled to an electronic module 104 containing a sensing circuit, wherein the sensing circuit 106 is preferably adapted to measure the capacitance of at least one electrode 103 of the electric field sensor 100 with respect to a circuit ground 110. The sensing circuit 106 is operatively coupled to a controller (not illustrated) for controlling the activation of a safety restraint system responsive to a signal form the electric field sensor 100 representing a type of object on the seat 3.

Figures 2A, 2B:
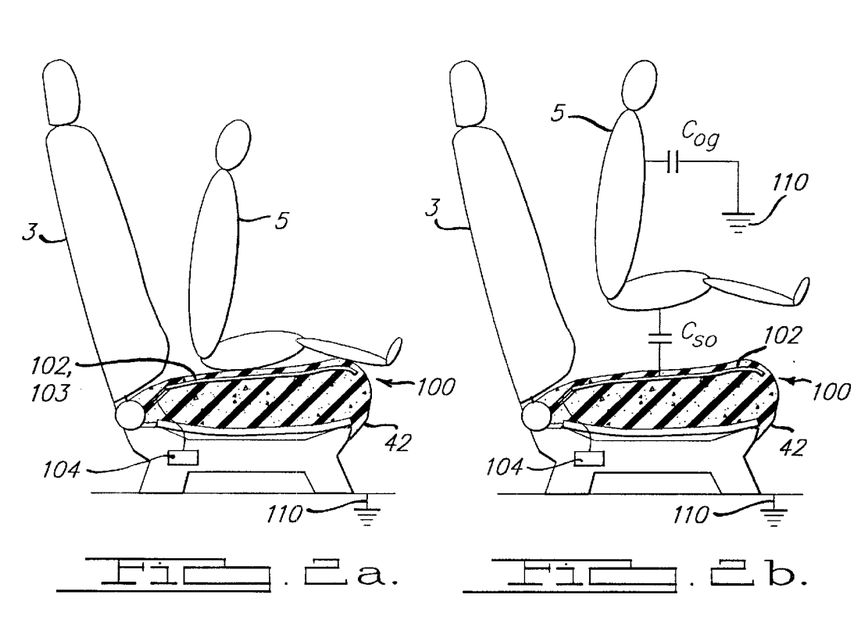
FIGS. 2a and 2b illustrates the capacitance of the occupant in the environment of the instant invention.

Referring to FIGS. 2a and 2b, one potential source of inconsistent capacitance measurements is inconsistent coupling to circuit ground 110 by the occupant 5. The electric field sensor 100 is sensitive to this coupling because the magnitude of the capacitance being sensed is relatively low. The electric field sensor 100 measures the capacitance from the capacitive sensing pad 102 to circuit ground 110. Because the occupant 5 is very close to the capacitive sensing pad 102 and the occupant 5 may be fairly small, $C_{so}$, the capacitance between the capacitive sensing pad 102 and the occupant 5, may be large compared to $C_{og}$, the capacitance between the occupant 5 and circuit ground 110. In this case, the measurement of the capacitance from the capacitive sensing pad 102 to circuit ground 110 will be dominated by $C_{og}$ and the occupant 5 seated directly on the seat may be mistaken as a child seat.

Figure 3:
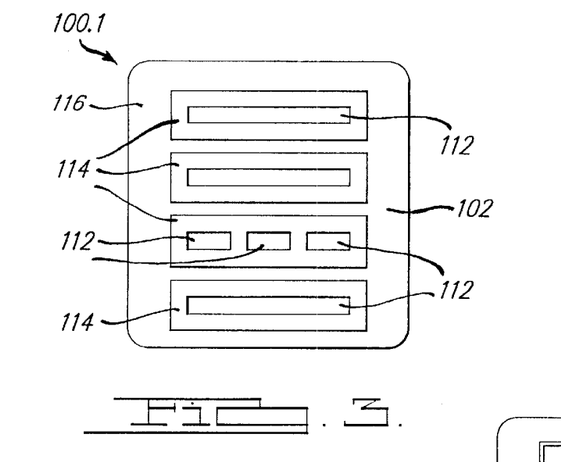
FIG. 3 illustrates a first aspect of an electric field sensor in accordance with the instant invention.

Referring to FIG. 3, the capacitive sensing pad 102 can be adapted in accordance with the instant invention to provide consistently high $C_{og}$ values. A group of small sensor electrodes 112 is distributed across the sensing area, with small ground planes 116 distributed therebetween. An occupant 5 seated directly on the seat 3 is seated close to both the sensor electrodes 112 and the ground planes 116. Accordingly, $C_{og}$ will be consistently high such that the total capacitance from the capacitive sensing pad 102 to the circuit ground 110 will depend largely on $C_{so}$. The ground planes 116 should be placed far enough away from the sensing electrodes 112 so that the corresponding range of capacitances of the capacitive sensing pad 102 is not overly reduced so that the electric field sensor 100.1 becomes impractical. This may require that the driven shield 114 extend beyond the sensing electrode 112. The driven shield 114 isolates the sensing electrodes 112 from the ground plane 116. One of ordinary skill in the art will recognize that many variations of the capacitive sensing pad 102 are possible, and that the arrangement of FIG. 3 is illustrative and not limiting. The sensor electrodes 112, driven shields 114 and ground planes 116 may be located either on a common plane, or on separate planes in overlapping relationship with one another. The sensor electrodes are operatively coupled to the sensing circuit, which measures the capacitance thereof with respect to the circuit ground 110.

Figures 6, 7:
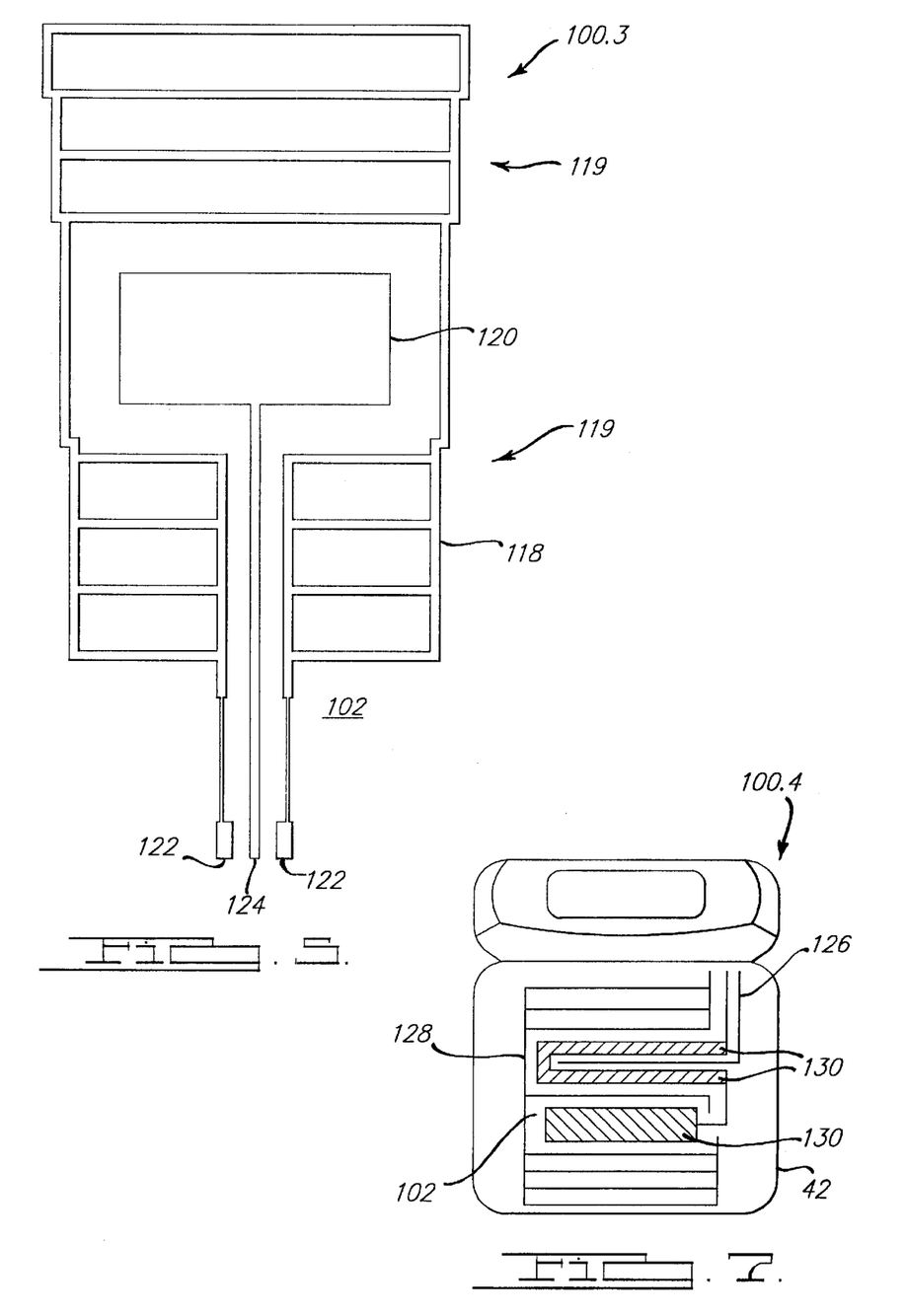
FIG. 6 illustrates the performance of the instant invention incorporating a capacitive sensor in accordance with the embodiment illustrated in FIG. 4.
FIG. 7 illustrates a third aspect of the instant invention.

The ground planes 130 shown in FIG. 7 are useful for this purpose.

Figure 4:
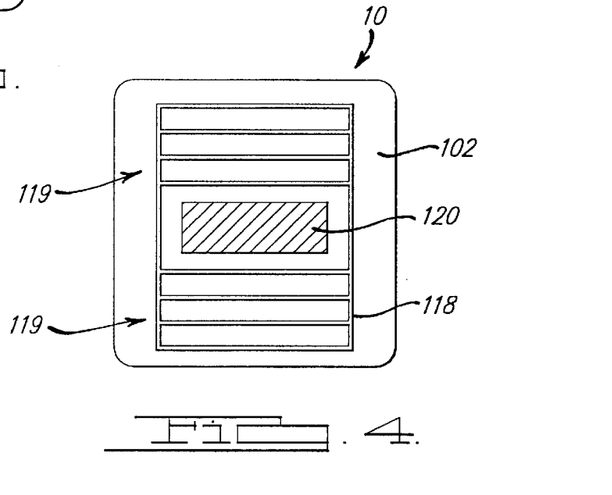
FIG. 4 illustrates a second aspect of an electric field sensor in accordance with the instant invention.

A simple version of an electric field sensor 100.2 incorporates strips 118 that are spaced apart in a lattice pattern 119 as shown in FIG. 4. No driven shields are used in this version. The electric field sensor 100.2 may be more vulnerable to sensing the water of a soaked seat, but when it is used with a weight sensor the total system will usually still make the correct enable/disable decision. The ground plane 120 in the sensor shown in FIG. 4 is located in the region on the seat bottom 42 where the gap could be small between the seat bottom and a child in a rear facing child seat so as to reduce the capacitance sensed when a rear facing child seat is located on the vehicle seat 3.

Figure 5:
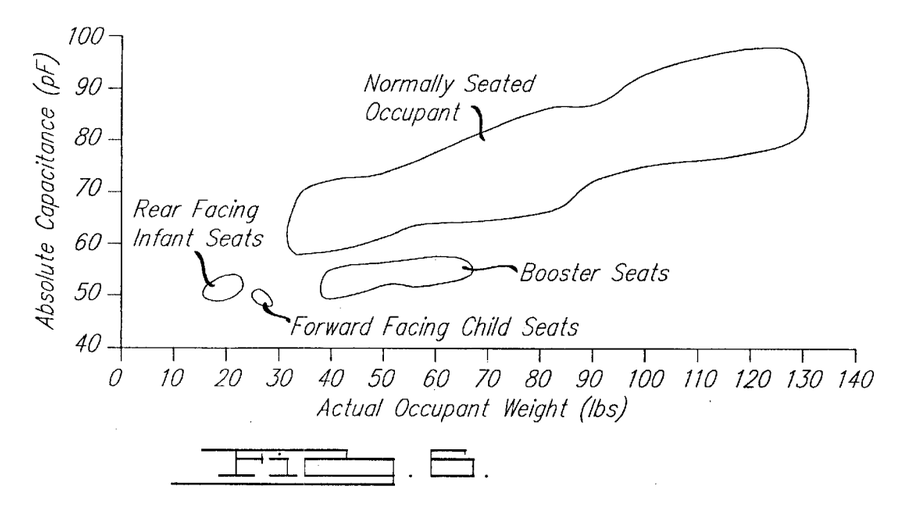
FIG. 5 illustrates another embodiment of the second aspect of an electric field sensor in accordance with the instant invention.

FIG. 5 illustrates and improved embodiment of this lattice 119 arrangement wherein the sensing electrode 118 is terminated at a plurality of first terminals 122 providing for improved redundancy and reliability. The first terminals 122 are operatively coupled to the sensing circuit, which measures the capacitance at the first terminals 122 with respect to circuit ground 110. The ground plane is terminated at a second terminal 124, which is either operatively coupled to the sensing circuit, or directly coupled to circuit ground 110.

The ground planes in FIG. 4 and 5 can be switched "in or out" to gain extra information. The ground plane could be left electrically floating, which means it will have little impact on the measurement. The ground plane could also be pulled to ground to increase $C_{og}$. Switching between these two states can be inexpensive and provide additional information about the situation in the seat.

The relatively small area of the sensor in FIGS. 4 and 5 also reduces the $C_{so}$ enough such that it is significantly less than $C_{og}$ so that the capacitance of the sensing electrode 118 to circuit ground 110 is dominated by $C_{so}$.

Results from trials of a system using a capacitive sensor similar to the sensor shown in FIG. 4 are shown in FIG. 6, representing data taken with human subjects seated directly on the vehicle seat bottom or in a child seat.

As can be seen in FIG. 6 there is a clear margin between any of the child seat cases and the occupants weighing over 100 lbs. While a weight sensor may have difficulties distinguishing between the 60 lb. child on a ten pound booster seat from a small adult, the capacitive sensor will identify that there is no adult seated directly on the seat bottom and the system would suppress the air bag. Also, if the lap belt were very tight on a rear facing infant seat, the force on the seat may be very high, but the capacitive sensor would identify that there is no adult seated directly on the seat bottom and, again, the air bag would be suppressed. If a child is seated directly on the seat bottom, a weight sensor is a reliable measurement and can be used to make the deployment decision.

Referring to FIG. 6, the electric field sensor 100.4 may be adapted with a receive electrode 126 for sensing the signal sent from the sensing electrode 128 when an occupant is seated upon both. When the seat 3 is relatively wet, the foam cushion 44 may become saturated causing the electric field sensor 100.4 in the seat bottom 42 to identify an increase in signal large enough to represent an occupant directly on the seat. The receive electrode 126 in the seat bottom 42 can be used to verify the occupant situation even when the seat is saturated. The receive electrode 126 is preferably in the same plane as the sensing electrode 128. The two electrodes are separated by "ground plane gap". The receive electrode 126 senses the changes in the electric potential caused by changes in potential induced on the capacitive sensing electrode (the transmitter) through capacitive coupling between the receive 126 and sensing 128 electrodes. The amplitude of the changes at the receiver electrode increase dramatically when there is conductor coupled to both the receiver and the transmitter. This is the case when a human body part is well coupled to both electrodes.

This is also the case when the seat becomes wet if the signal is a low frequency (or long pulse length) signal. If the signal's frequency is above approximately 1 MHz the signal is not conducted well through the wet seat materials. The signal continues to be conducted well through a human body part at high frequencies. Thus at frequencies above 1 MHz, there is a large difference between the signal received in the empty wet seat and the signal received when an occupant is seated directly on the seat (whether the seat is wet or dry).

While this second sensing arrangement has a significant advantage over the basic capacitive sensing arrangement when the seat is wet, it also has some failure modes of its own which makes the best system a combination system. When the seat is dry, the best system is the capacitive sensing system because it will not be fooled by most complicating child seat cases. For example, a child seat with a relatively small piece of metal under the child seat could cause the electric field sensing concept to misidentify the situation as an adult seated directly on the seat. Small, ungrounded conductors don't heavily influence the capacitive sensor, however.

FIG. 7 shows one possible configuration of the combination sensor.

It is possible to further interdigitize the capacitive sensing and the receiver electrodes to ensure that occupants seated directly on the seat will be coupled to both electrodes in most occupant positions.

To most effectively use the combination of the two sensors, a wet seat must be accurately identified. This can be done using the frequency or phase characteristics of the capacitive sensor signal when the seat is wet.

If the seat is wet enough to significantly influence the measurements, then the decision would be based on the electric field sensing concept using the receive electrode 126.

Generally, the elements of the capacitive sensing pad 102 distributed sparsely across the seat 3, thereby covering a smaller area than the entire area to be sensed on the seat 3. One of ordinary skill in the art will recognize that the capacitive sensing pad 102, and the elements thereof, can be embodied in a variety of shapes without departing from the teachings of the instant invention.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the fall breadth of the appended claims and any and all equivalents thereof.

We claim:

1. An occupant sensor, comprising:
   a. a first electric field sensor comprising:
      (i) a plurality of first electrodes mountable within a vehicle seat, wherein said plurality of first electrodes are disposed on a common surface and are non-overlapping with one another; and
      (ii) at least one second electrode, wherein said at least one second electrode is proximate to at least one said first electrode; and
   b. a first sensing circuit operatively coupled to at least one said first electrode and to at least one second electrode, wherein said first sensing circuit applies a first applied signal to said at least one said first electrode, said first sensing circuit applies a second applied signal to said at least one said second electrode, said second applied signal is selected from the group consisting of a circuit ground, said first applied signal, a signal switched between a floating level and a circuit ground, and a potential between said first applied signal and said circuit ground, so as to control the level of capacitance between an occupant on said vehicle seat and said circuit ground, and said first sensing circuit generates a first signal responsive to at least one electric field influencing property of an object proximate to said first electric field sensor.

2. An occupant sensor as recited in claim 1, wherein at least one said second electrode is operatively coupled to said circuit ground.

3. An occupant sensor as recited in claim 1, wherein at least one said second electrode is disposed on said common surface.

4. An occupant sensor as recited in claim 1, wherein at least one said second electrode is non-overlapping with at least one said first electrode.

5. An occupant sensor as recited in claim 1, wherein at least one said second electrode overlaps at least one said first electrode.

6. An occupant sensor as recited in claim 1, wherein at least one said second electrode extends beyond at least one said first electrode.

7. An occupant sensor as recited in claim 6, wherein at least one said second electrode surrounds at least one said first electrode.

8. An occupant sensor as recited in claim 7, wherein at least one said second electrode surrounds at least one said first electrode on said common surface.

9. An occupant sensor as recited in claim 1, wherein said first electric field sensor further comprises at least one third electrode, wherein at least one said third electrode is proximate to at least one said second electrode and said at least one second electrode isolates at least one said first electrode from said at least one third electrode, and said first sensing circuit is operatively coupled to at least one of said at least one third electrode.

10. An occupant sensor as recited in claim 9, wherein at least one said third electrode is operatively coupled to said circuit ground.

11. An occupant sensor as recited in claim 9, wherein at least one said third electrode is disposed on said common surface.

12. An occupant sensor as recited in claim 9, wherein at least one said third electrode is non-overlapping with said at least one said first electrode.

13. An occupant sensor as recited in claim 9, wherein at least one said third electrode overlaps at least one said first electrode.

14. An occupant sensor as recited in claim 9, wherein at least one said third electrode is non-overlapping with at least one said second electrode.

15. An occupant sensor as recited in claim 9, wherein at least one said third electrode overlaps at least one said second electrode.

16. An occupant sensor as recited in claim 9, wherein at least one said third electrode extends beyond at least one said second electrode.

17. An occupant sensor as recited in claim 16, wherein at least one said third electrode surrounds at least one said second electrode.

18. An occupant sensor as recited in claim 17, wherein at least one said third electrode surrounds at least one said second electrode on said common surface.

19. An occupant sensor mountable in a vehicle seat, comprising:
   a. a first electric field sensor comprising at least one first electrode mountable within a vehicle seat, wherein said at least one first electrode comprises a lattice, and said at least one first electrode comprising said lattice is connected to a terminal; and
   b. a first sensing circuit operatively coupled to said terminal, wherein said first sensing circuit generates a first signal responsive to at least one electric field influencing property of an object proximate to said first electric field sensor.

20. An occupant sensor as recited in claim 19, wherein a surface area of said lattice is adapted so that a capacitance between an occupant on said vehicle seat and said first electrode is substantially less than a capacitance between said occupant and said circuit ground.

21. An occupant sensor mountable in a vehicle seat, comprising:
   a. a first electric field sensor comprising at least one first electrode mountable within a vehicle seat, wherein said at least one first electrode comprises a lattice;
   b. at least one second electrode, wherein at least one said second electrode is disposed within said lattice of said fist electrode; and
   c. a first sensing circuit operatively coupled to at least one said first electrode wherein said first sensing circuit generates a first signal responsive to at least one electric field influencing property of an object proximate to said first electric field sensor.

22. An occupant sensor as recited in claim 21, wherein said at least one second electrode is isolated from said first electrode.

23. An occupant sensor as recited in claim 21, wherein said at least one second electrode is positioned relative to a seat bottom of said vehicle seat at a location proximate to an object selected from the group consisting of an infant seat on said vehicle seat, a child seat on said vehicle seat, and a booster seat on said vehicle seat.

24. An occupant sensor, comprising:
   a. a first electric field sensor comprising:
      (i) at least one first electrode mountable within a vehicle seat; and
      (ii) at least one second electrode, wherein said at least one second electrode is isolated from said first electrode and is adapted to receive a first signal from said at least one first electrode; and
   b. a first sensing circuit operatively coupled to at least one said first electrode and to said at least one second electrode wherein said first sensing circuit generates a second signal responsive to at least one electric field influencing property of an object proximate to said first electric field sensor.

25. An occupant sensor as recited in claim 24, wherein said second electrode is located within said vehicle seat.

26. An occupant sensor as recited in claim 24, wherein said second electrode capacitively couples to an occupant seated in said vehicle seat.

27. An occupant sensor as recited in claim 24, wherein at least one said first electrode and at least one said second electrode are on a common surface.

28. An occupant sensor as recited in claim 24, wherein a magnitude of said first signal is responsive to a wetness condition of said vehicle seat.

29. An occupant sensor as recited in claim 28, wherein said first sensing circuit measures said magnitude at a plurality of frequencies.

30. An occupant sensor as recited in claim 29, wherein said plurality of frequencies comprises first and second frequencies.

31. An occupant sensor as recited in claim 30, wherein said first frequency is less than 100 kilohertz and said second frequency is greater than 800 kilohertz.

32. An occupant sensor as recited in claim 30, wherein said magnitude at said first frequency is greater than said magnitude at said second frequency when said vehicle seat is wetted by a liquid, and said magnitude at said second frequency for an occupant in said vehicle seat is greater than said magnitude at said second frequency when an occupant is not seated in said vehicle seat.

33. An occupant sensor as recited in claim 28, wherein said first sensing circuit measures said magnitude at a plurality of different pulse widths.

34. An occupant sensor as recited in claim 28, wherein said magnitude of said first signal is responsive to the presence of an occupant on said vehicle seat.

35. An occupant sensor as recited in claim 24, wherein said first electric field sensor further comprises at least one third electrode, and at least one said third electrode is located between at least one said first electrode and at least one said second electrode.

36. An occupant sensor as recited in claim 35, wherein said at least one third electrode is operatively coupled to said circuit ground.

* * * * *

UNITED STATES PATENT AND TRADEMARK OFFICE
CERTIFICATE OF CORRECTION

PATENT NO. : 6,563,231 B1
DATED : May 13, 2003
INVENTOR(S) : James G. Stanley et al.

It is certified that error appears in the above-identified patent and that said Letters Patent is hereby corrected as shown below:

Column 1,
Lines 19, 28, 34 and 41, "entitled Occupant Detection System" should be deleted before ", filed on".

Column 3,
Line 66, "au" should be changed to -- an --; and "5,447,261" should be changed to -- 5,247,261 --.

Column 10,
Line 16, "fall" should be changed to -- full --.

Column 11,
Line 57, "fist" should be changed to -- first --.

Signed and Sealed this

Twenty-first Day of December, 2004

JON W. DUDAS
*Director of the United States Patent and Trademark Office*